May 4, 1937. W. N. GLAB 2,079,164
RELIEF VALVE
Filed Dec. 6, 1935 2 Sheets-Sheet 1
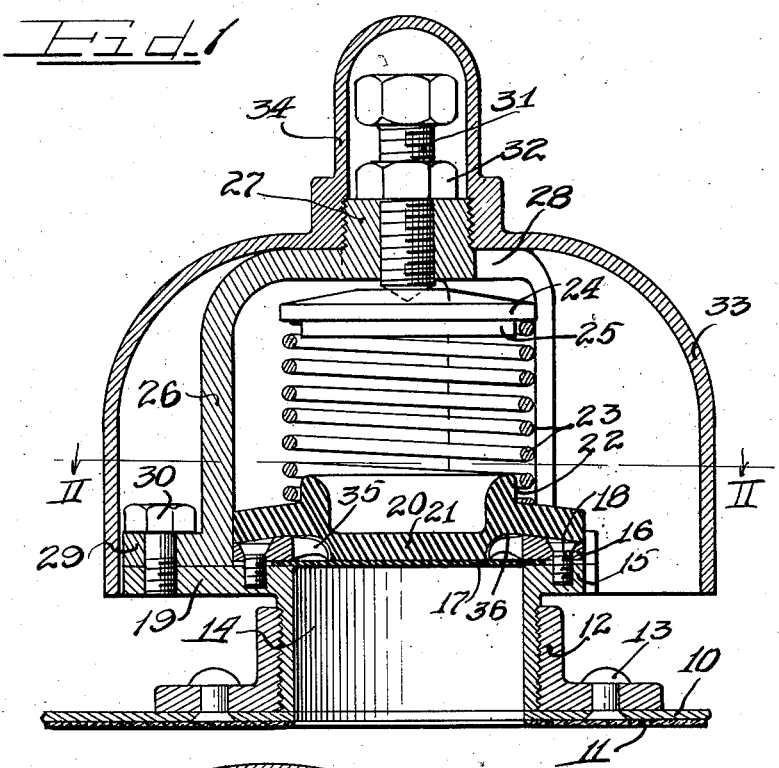
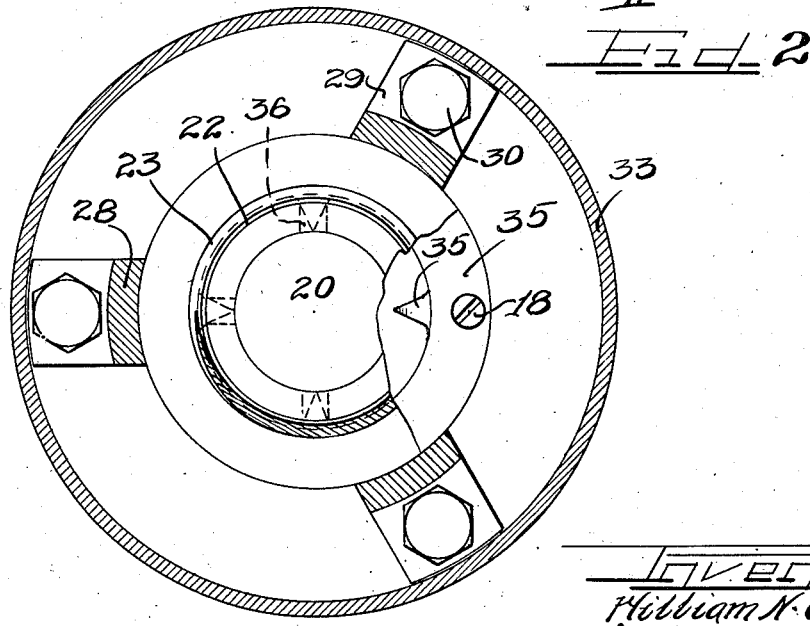
Inventor
William N. Glab
by Charles ... Atty.

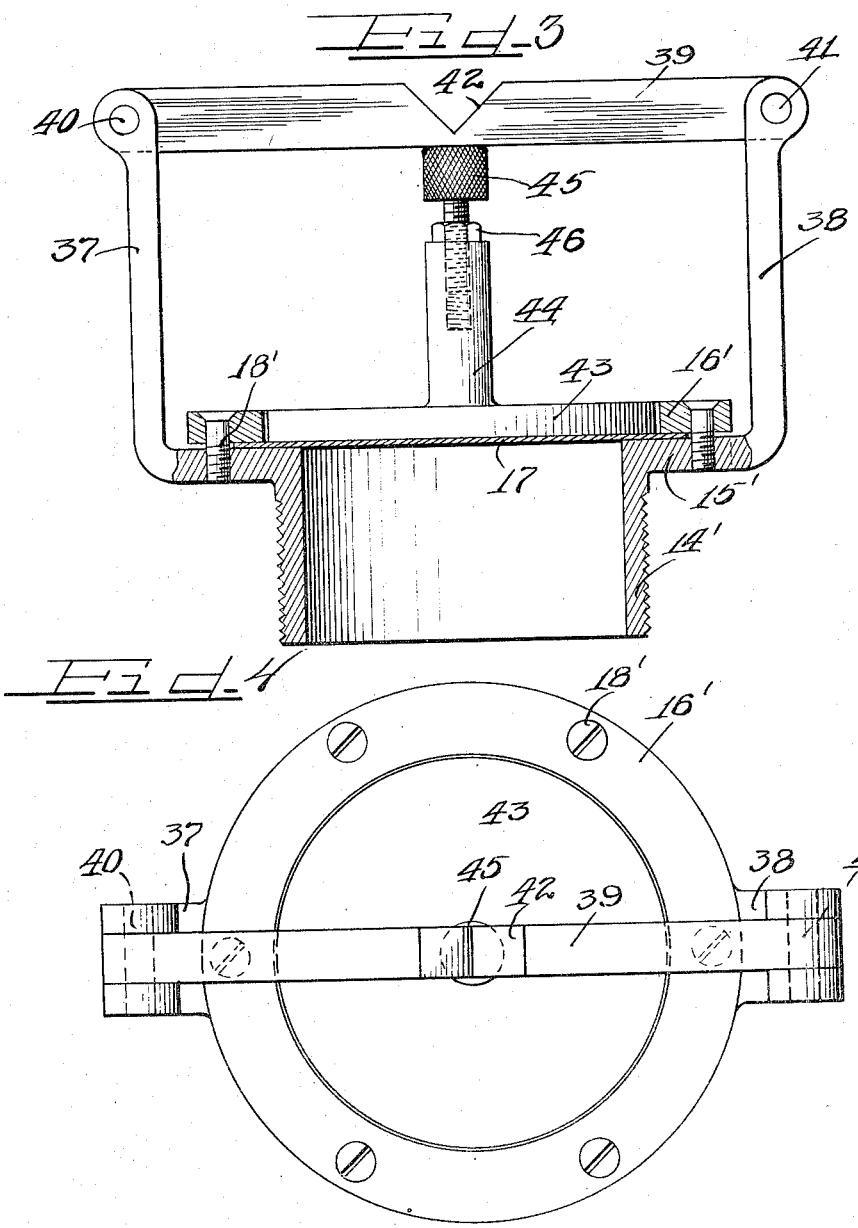

Patented May 4, 1937

2,079,164

UNITED STATES PATENT OFFICE 2,079,164

RELIEF VALVE

William N. Glab, Dubuque, Iowa, assignor to Morrison Brothers Company, Dubuque, Iowa, a corporation of Iowa Application December 6, 1935, Serial No. 53,148

5 Claims. (Cl. 137—53)

The present invention relates in general to a valve, and is more particularly concerned with improved valve means for the relief of comparatively low pressures.

There are many industrial installations where it is desirable to utilize a low pressure relief valve for venting or relieving the pressure within a receiver containing a fluid of such nature that direct contact of the fluid with the valve parts would tend to damage or otherwise interfere with their reliable operation.

One example of such a condition exists in the manufacture of beverages such as beer. During the course of manufacture, it is customary at certain stages to place the beer in tanks lined with glass, porcelain or other frangible material. It will be apparent that if the pressure within these tanks should for some reason be increased very much, there is grave danger of breaking the tank lining, which would, of course, result in the spoiling and loss of the entire contents of the tank.

The usual type of relief valve, arranged to work at low pressures, is unreliable under such conditions as any fluid getting on the valve parts would cause them to stick.

In this connection, it has been suggested that rubber seating surfaces be utilized for the valve parts, but it has been found that rubber parts tend to vulcanize or stick the valve parts together. This is especially objectionable as the parts are operated only in case of emergency or at widely spaced intervals. Metal to metal seating surfaces have also been suggested, but here again the parts are unreliable, since the albumen in the beer would cause the metal parts to stick together.

Moreover, in the specific application discussed above, it is also desirable to have a valve which will positively prevent under normal conditions entrance of any foreign matter into the tank fluid, as this would have a tendency to contaminate the fluid and render it unusable, especially in the case of a beverage such as beer.

With the foregoing conditions in mind, the present invention contemplates as a primary object a relief valve of such construction that its parts are normally sealed from direct contact by the fluid in the receiver being protected, but which will operate in a thoroughly reliable manner whenever necessary.

A further object resides in improved means in a valve structure for shielding or protecting the valve parts from direct contact by the fluid in a receiver being protected against increased pressures above a predetermined amount, but wherein the valve parts are free to respond to the receiver pressure and open at a predetermined pressure in the receiver.

Another object of the invention is to provide a relief valve of the character described for a fluid container, wherein the valve parts are normally sealed against contact by the fluid by means of a frangible diaphragm adapted to have a relatively low rupturing pressure, but which is kept from rupturing by the valve until the valve is unseated.

Still another object is to provide a valve as described above, wherein rupture of the diaphragm is positively assured by the provision of diaphragm cutting means which are normally inoperative when the valve is seated, but which will be rendered operative when the valve is unseated.

It is also an object to provide a low pressure relief valve which is leak-proof.

In accordance with the general features of the preferred form of the invention, it is proposed to provide a tubular connection by means of which the valve may be connected to a container for protecting the same against the occurrence of relatively low pressures. At one end of the tubular connection, there is provided a valve seat which is also used as a clamping ring for securing across the tubular connection a diaphragm of rubber or frangible material, this diaphragm normally having a relatively low rupturing capacity. The upper surface of the clamping ring forms a seat for a valve member which is arranged to engage the upper surface of the frangible diaphragm and retain it against rupturing until the valve is unseated. This valve is normally opposed in its movement to unseated position by means of an adjustable spring or other means which will retain the valve seated until a predetermined pressure has been built up within the receiver being protected.

As a further feature of the invention, it is proposed to provide positive means for assuring that the diaphragm will be ruptured when the valve is unseated. For this purpose, the seating ring is provided with a plurality of cutting pointed projections which are disposed above the diaphragm and which are normally rendered inoperative to puncture the diaphragm by being sheathed within pockets in the valve member, but which are exposed when the valve member is unseated. Due to the flexibility of the diaphragm, the diaphragm will be forced into engagement with these points by means of the pressure within the tank or receiver being protected, and, of course, the points will puncture or rupture the diaphragm, when the valve is opened.

Other objects and features of the invention will more fully appear from the following detailed description, taken in connection with the accompanying drawings, which illustrate several embodiments thereof, and in which:

Figure 1 is an enlarged vertical section through the relief valve of the present invention, showing the same applied to a tank or receiver having a frangible lining, such as glass or porcelain;

Figure 2 is a transverse sectional view through the valve taken substantially on the line II—II of Figure 1, portions being cut away to show the means for rupturing the diaphragm when the valve is opened;

Figure 3 is an elevational view of a modified form of the invention, portions being in section to show details of the associated instrumentalities; and Figure 4 is a plan view of the modified form of the invention.

As shown on the drawings:

In Figure 1, there is illustrated a low pressure relief valve embodying the features of the present invention, this valve being shown connected to a container or receiver having an outer shell 10 and an interior lining 11 of glass, porcelain or other frangible material. It will be obvious that in a tank of this construction, the building up of a pressure therein which is very much above atmospheric pressure would tend to cause a distortion of the tank shell and might very easily crack or damage the interior lining of the tank. In such an event, the fluid within the tank would, of course, be rendered useless. Such a condition would be especially undesirable in the case of beverages or other liquids which are to be consumed by the public.

Although the valve may be attached to a tank in any one of a number of different ways, the receiver herein is disclosed for purposes of illustration as having a flange member 12 which is secured in any suitable manner, such as by rivets 13. This flange is internally threaded to receive a nipple 14 having one end deflected to form a right-angled flange 15.

The flange 15 cooperates with a ring-shaped clamping member 16, and a diaphragm 17 is clampingly engaged at its peripheral margin therebetween. The member 16 is clampingly secured by a plurality of spaced screws 18 which extend through the ring and threadedly engage the flange 15. The diaphragm is preferably constructed of thin rubber, metal foil or other material which is adapted to rupture at a relatively low pressure, for example, approximately two pounds pressure per square inch.

At circumferentially spaced points around the flange 15, this flange is extended radially to form a plurality of arms as shown at 19. The upper surface of the ring 16 is outwardly and downwardly beveled to form an inclined seating surface. Cooperatively associated with the seating surface is a valve 20 having its marginal undersurface inclined to make a seating engagement with the seating surface of the ring 16.

The central portion of the valve member 20 is downwardly deflected to define a portion 21 having a plain lower face which bears against or is closely spaced relative to the outer surface of the diaphragm 17. The upper surface of the valve member is provided with a ring-shaped shoulder 22 over which one end of an expansible spring 23 is placed. The other end of this spring engages a disk-shaped member 24 which is provided with an annular groove 25 for receiving this end of the spring.

For compressing the spring 23 so as to adjust the pressure which is applied to hold the valve 21 in seated position, there is provided a cage member 26 having a central hub 27 from which a plurality of arms 28 extend outwardly in a radial direction. These arms are each downwardly deflected to provide guides for the valve 20 and are then outwardly deflected to form feet 29 which are respectively secured to the arms 19 as by screw bolts 30.

A bolt 31 extends through the hub portion 27 and is in threaded engagement therewith, so that by turning the bolt it may be axially shifted relative to the hub. The end of the bolt bears against the disk 24. If the bolt is screwed into the hub, the spring is compressed and the pressure due to the spring acting on the valve 20 is likewise increased. Movement of the bolt in the opposite direction causes it to move outwardly relative to the hub and decrease the pressure applied by the spring on the valve member. In order to secure the bolt in adjusted position, a lock nut 32 is provided which may be screwed down against the outer face of the hub.

For protecting the valve assembly against dirt and to form a housing therefor, a bell-shaped member 33 is provided. This member is also provided at its central portion with a hollow neck portion 34 which threadedly engages the hub 27 on the cage. The cage 26 therefore forms a bracket which supports the bell-shaped housing in position. The housing 33 is disposed with its open end downwardly, and the lower edge of the housing is disposed below the flange 15 so that the operative instrumentalities of the valve are protected and any fluid which passes out of the receiver when the valve is opened will be deflected back against the receiver shell.

In operation, the bolt 31 is adjusted to cause the spring 23 to retain the valve closed until a predetermined pressure is applied to the undersurface of the valve. In practice, this would be around sixteen or seventeen pounds per square inch. As before stated, the diaphragm is of such material that it would ordinarily rupture at approximately two pounds pressure per square inch, but is retained against rupture by means of the valve when it is in seated position. However, due to the flexibility of the diaphragm, the pressure within the receiver will act to oppose the pressure of the spring 23 and, in addition, the diaphragm also serves as a shield or seal to protect the valve parts from direct contact with fluid within the receiver. The seating surfaces of the valve and seat are therefore always clean and ready to operate. Moreover, the diaphragm also prevents any leakage through the valve parts.

In order to assure that the diaphragm will be ruptured when the valve is opened, in some cases it may be found desirable to provide a plurality of cutting points 35 which project inwardly from and are secured to the ring 16. These points project into associated pockets 36 formed in the undersurface of the valve member, and it will be noted that when the valve is closed, these cutting points are sheathed and it is impossible for the diaphragm to be deflected against them and ruptured. When the pressure within the receiver increases to the valve setting, the valve opens and in doing so exposes the cutting points 35. This pressure acts to deflect the diaphragm against these points and positively cause it to rupture. Of course, after the valve has operated to relieve the pressure in the receiver, the ring 16 must be removed and a new diaphragm inserted before the valve is ready to operate again.

In Figures 3 and 4, there is disclosed a modified construction which operates on the same principle as the preferred embodiment of the invention.

In this form of the invention, the nipple 14' is threaded for securement to a receiver or tank in the same manner as previously described for the preferred embodiment. The upper end of this nipple is deflected to similarly form an outwardly extending flange 15' which, in this case, has a pair of diametrically disposed arms 37 and 38. These arms at their free ends are provided with hinge connections whereby a breaking bar 39 may be secured at its ends as by pins 40 and 41 to the arms 37 and 38. This bar is of a material which, when pressure is applied at its center, will break at a predetermined pressure. In order that this bar may be of a finite character and also break at a relatively low pressure, for example, around seventeen pounds per square inch, the breaking pressure of the bar may be established by providing a medial notch, as shown at 42.

In this form of the invention, the diaphragm 17 is clampingly secured against the flange 15' by means of a clamping ring 16', as in the other form of the invention. It will be noted, however, that in this case the clamping ring has an internal diameter which is greater than the internal diameter of the nipple 14', so that the outer surface of the diaphragm may be engaged by a disk-shaped valve member 43. The peripheral margin of this valve member will extend outwardly over the flange 15', and the diaphragm material which is between the valve member and the flange 15' will be additionally clamped.

A stem 44 extends upwardly at the center of the disk 43 and is provided at its upper end with an adjustable thumb screw 45 which may be raised and lowered into engagement with the bar 39 at its notched portion. The thumb screw 45 would be raised until a slight pressure is exerted on the valve disk, thereby assuring that as soon as the pressure begins building up within the receiver, this pressure will be immediately applied against the bar 39, without first having to take up any slack or lost motion. A lock nut 46 is provided for locking the thumb screw in adjusted position so that it may not be inadvertently changed once it has been set.

This form of the invention, although of more simple construction, operates on the same principle as the preferred embodiment of the invention. When the pressure builds up within the receiver or container, this pressure acts on the valve disk 43 to move it upwardly. As soon as this pressure reaches a value determined by the breaking characteristics of the bar 39, this bar will break and permit the valve disk to open sufficiently to permit rupture of the diaphragm 17. With the valve closed, the diaphragm forms a seal which will keep the valve parts from leaking and prevent the entrance of foreign matter into the receiver. Moreover, the seal also will act to protect the seating surfaces of the valve from direct contact by fluid from within the receiver.

From the foregoing description, it will be apparent that this invention provides a novel relief valve which is particularly adapted for operation at low pressures, a valve which is normally sealed against the entrance of foreign matter and has its parts shielded against direct contact by the fluid within the receiver; which is provided with a diaphragm that acts as a seal to prevent leakage of the valve; and which may be easily arranged with cutting points to assure a positive rupturing of the seal when the valve opens.

It is of course to be understood that although I have described in detail several embodiments of my invention, the invention is not to be thus limited, but only insofar as defined by the scope and spirit of the appended claims.

I claim as my invention:

1. A valve structure of the character described comprising an annular valve seat, a movable valve cooperatively associated with said seat and having a pocket on its underside disposed inwardly of said seat, a stationary cutting member disposed in said pocket when the valve is seated, and exposed when the valve is unseated, and a deflectable diaphragm below said valve arranged to engage said cutting member when the valve is unseated, whereby said diaphragm is ruptured.

2. A valve structure of the character described comprising a tubular member adapted for communicative connection with a receiver for a fluid under pressure, a diaphragm extending over the upper end of said member, a clamping member cooperatively associated with said member to clampingly engage the peripheral edge portion of said diaphragm, means for securing said clamping member in clamped position, and a valve having a peripheral surface arranged to seat on said clamping member and extend over said securing means to render it inaccessible when the valve is seated, said valve having a surface normally restraining the diaphragm against upward movement and enabling movement thereof when a predetermined pressure occurs.

3. A valve structure of the character described comprising a tubular member adapted for communicative connection with a receiver for a fluid under pressure, a diaphragm extending over the upper end of said member, a clamping ring cooperatively associated with said member to clampingly engage the peripheral edge portion of said diaphragm, said ring having a plurality of spaced apertures therein, and securing members extending through said apertures for threadedly engaging said member, a valve having a peripheral surface arranged to seat on the clamping member and extend over said apertures, whereby said securing members are rendered inaccessible when the valve is seated, said valve having a surface normally restraining the diaphragm against upward movement and enabling movement thereof when a predetermined pressure occurs.

4. A valve structure of the character described comprising an annular member defining a valve seat, a movable valve cooperatively associated with said seat and having a pocket on its under side disposed inwardly of said seat, a cutting member carried by said annular member arranged to be disposed in said pocket when the valve is seated, and exposed when the valve is unseated, and a deflectable diaphragm below said valve arranged to engage said cutting member when the valve is unseated, whereby the diaphragm is ruptured.

5. A valve structure of the character described comprising a tubular member adapted for communicative connection with a receiver for a fluid under pressure, an annular clamping member secured to the upper end of said member having an upper surface defining a valve seat, a diaphragm clampingly secured at its periphery between said members, a cutting member integrally formed with said clamping member projecting inwardly therefrom over said diaphragm, a valve member cooperatively associated with the seat of said clamping member, said valve member having a pocket for receiving the cutting member, whereby the cutting member is protected from engagement by the diaphragm when the valve is seated, and exposed for engagement thereby when the valve is unseated, a surface on the under side of said valve for engaging and reinforcing the diaphragm, when the valve is seated, and means resisting the unseating of said valve, said means being adjustable to vary the pressure at which the valve will be unseated.

WILLIAM N. GLAB.